United States Patent
Bunker et al.

(10) Patent No.: US 10,590,786 B2
(45) Date of Patent: Mar. 17, 2020

(54) SYSTEM AND METHOD FOR COOLING COMPONENTS OF A GAS TURBINE ENGINE

(71) Applicant: General Electric Company, Schenectady, NY (US)

(72) Inventors: Ronald Scott Bunker, West Chester, OH (US); Robert Charles Groves, II, West Chester, OH (US)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 15/144,857

(22) Filed: May 3, 2016

(65) Prior Publication Data

US 2017/0321564 A1    Nov. 9, 2017

(51) Int. Cl.
F01D 9/06    (2006.01)
F01D 5/18    (2006.01)
(Continued)

(52) U.S. Cl.
CPC .............. F01D 9/065 (2013.01); F01D 5/18 (2013.01); F01D 5/187 (2013.01); F01D 9/041 (2013.01); F01D 9/048 (2013.01); F01D 25/12 (2013.01); F01D 25/14 (2013.01); F01D 25/24 (2013.01); F05D 2220/32 (2013.01);
(Continued)

(58) Field of Classification Search
CPC .......... F01D 9/065; F01D 25/14; F01D 5/225; F01D 5/187; F01D 9/041; F01D 25/24; F01D 5/18; F01D 9/048; Y02T 50/676; F05D 2240/307; F05D 2260/205;
(Continued)

(56) References Cited

U.S. PATENT DOCUMENTS 2,698,711 A * 1/1955 Newcomb ........... F04D 27/0215
251/61.1
3,286,461 A * 11/1966 Johnson .................. F01D 5/081
415/116

(Continued)

FOREIGN PATENT DOCUMENTS

EP    1 033 484 A2    9/2000
EP    1 389 668 A1    2/2004
WO    2006/059990 A1    6/2006

OTHER PUBLICATIONS

Extended European Search Report and Opinion issued in connection with corresponding EP Application No. 17168680.1 dated Sep. 27, 2017.

*Primary Examiner* — Dwayne J White
*Assistant Examiner* — Adam W Brown
(74) *Attorney, Agent, or Firm* — Dority & Manning, P.A.

(57) ABSTRACT

A method for cooling a component of a gas turbine engine includes flowing a cooling airflow through a cooling passage of a turbine rotor blade, wherein the cooling passage includes an inlet and an outlet formed on a blade tip of the turbine rotor blade. The method further includes receiving at least a portion of the cooling airflow exiting the outlet of the cooling passage with an aperture defined in a casing of the gas turbine engine, wherein the casing is spaced from the blade tip along the radial direction. In addition, the method includes providing the cooling airflow received with the aperture defined in the casing to the component of the gas turbine engine through a coolant duct assembly of the gas turbine engine.

15 Claims, 10 Drawing Sheets

(51) Int. Cl.
*F01D 25/14* (2006.01)
*F01D 9/04* (2006.01)
*F01D 25/12* (2006.01)
*F01D 25/24* (2006.01)

(52) U.S. Cl.
CPC ...... *F05D 2240/12* (2013.01); *F05D 2240/30* (2013.01); *F05D 2240/307* (2013.01); *F05D 2260/205* (2013.01); *F05D 2260/213* (2013.01); *F05D 2300/6033* (2013.01); *Y02T 50/676* (2013.01)

(58) Field of Classification Search
CPC ............. F05D 2240/30; F05D 2240/12; F05D 2260/213; F05D 2220/32; F05D 2300/6033
See application file for complete search history.

(56) References Cited

U.S. PATENT DOCUMENTS

| | | | |
|---|---|---|---|
| 3,496,725 A * | 2/1970 | Lipfert | F02K 7/005 415/116 |
| 4,571,937 A | 2/1986 | Albers | |
| 5,012,640 A * | 5/1991 | Mirville | F02C 3/073 415/110 |
| 5,253,976 A | 10/1993 | Cunha | |
| 6,004,095 A * | 12/1999 | Waitz | B64C 21/025 415/115 |
| 6,174,133 B1 | 1/2001 | Bunker | |
| 6,499,950 B2 | 12/2002 | Willett et al. | |
| 6,506,022 B2 | 1/2003 | Bunker | |
| 6,648,597 B1 | 11/2003 | Widrig et al. | |
| 6,851,264 B2 * | 2/2005 | Kirtley | F01D 5/145 415/144 |
| 6,884,030 B2 | 4/2005 | Darkins, Jr. et al. | |
| 7,094,021 B2 | 8/2006 | Haubert | |
| 7,563,504 B2 | 7/2009 | Mazzola et al. | |
| 7,607,286 B2 * | 10/2009 | Suciu | F01D 5/022 415/115 |
| 7,686,581 B2 | 3/2010 | Brittingham et al. | |
| 8,454,303 B2 | 6/2013 | Garcia-Crespo | |
| 8,511,990 B2 | 8/2013 | Giri | |
| 8,721,265 B1 * | 5/2014 | Brostmeyer | F04D 19/02 415/1 |
| 8,794,907 B1 * | 8/2014 | Brostmeyer | F02C 6/08 415/1 |
| 8,858,161 B1 * | 10/2014 | Ryznic | F02C 7/143 415/1 |
| 8,926,262 B2 | 1/2015 | Tanahashi et al. | |
| 9,045,990 B2 | 6/2015 | Alvanos et al. | |
| 2002/0124570 A1 * | 9/2002 | Akiyama | F01D 5/081 60/772 |
| 2009/0180896 A1 | 7/2009 | Brittingham | |
| 2012/0301275 A1 | 11/2012 | Suciu et al. | |
| 2013/0011271 A1 | 1/2013 | Shi et al. | |

* cited by examiner

SYSTEM AND METHOD FOR COOLING COMPONENTS OF A GAS TURBINE ENGINE

FIELD OF THE INFORMATION

The present subject matter relates generally to gas turbine engines and, more particularly, to a system and method for cooling components of a gas turbine engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of vanes that direct air entering the engine into downstream, rotating blades of the compressor. Collectively one row of compressor vanes and one row of compressor blades make up a "stage" of the compressor. Similarly, the high pressure turbine includes annular rows of vanes that direct the gases exiting the combustor into downstream, rotating blades of the turbine. Collectively one row of nozzle vanes and one row of turbine rotor blades make up a "stage" of the turbine. Typically, both the compressor and turbine include a plurality of successive stages.

In operation, a hot gas having a temperature between approximately 3000 and approximately 3500 degrees Fahrenheit flows through the turbine and each of its successive stages. However, the high temperatures experienced by the turbine during operation may stress the components of the turbine, specifically the turbine rotor blades. As such, in an effort to cool the turbine rotor blades, bleed air from the compressor flows through a cooling passage defined within the turbine rotor blade. The cooling passage generally extends from a root portion of the turbine rotor blade to a blade tip of the turbine rotor blade along a radial direction. Further, when the bleed air exits the cooling passage through outlets formed on the turbine rotor blade, the bleed air mixes with the hot gas. Thus, the bleed air may not be used to cool other components within the turbine.

Accordingly, a system and method for cooling components of a gas turbine engine would be welcomed within the technology. In particular, a system and method that more effectively uses a cooling airflow would be particularly beneficial.

BRIEF DESCRIPTION OF THE INVENTION

Aspects and advantages of the invention will be set forth in part in the following description, or may be obvious from the description, or may be learned through practice of the invention.

In a first exemplary embodiment, a system for cooling a component of a gas turbine engine is provided, wherein the gas turbine engine defines a radial direction. The system includes a turbine rotor blade that defines a cooling passage for providing a cooling airflow through the turbine rotor blade. The cooling passage includes an inlet and an outlet spaced from the inlet along the radial direction. In addition, the turbine rotor blade further includes a blade tip on which the outlet of the cooling passage is formed. The system also includes a casing spaced from the blade tip along the radial direction, and the casing defines an aperture in airflow communication with the outlet. In addition, the system includes a coolant duct assembly in airflow communication with the aperture of the casing such that the coolant duct assembly receives at least a portion of the cooling airflow exiting the cooling passage through the outlet. The system also distributes the cooling airflow provided through the coolant duct assembly to the component of the gas turbine engine.

In a second exemplary embodiment, a method for cooling a component of a gas turbine engine is provided, wherein the gas turbine engine defines a radial direction and includes a turbine rotor blade defining a cooling passage. The method includes flowing a cooling airflow through the cooling passage of the turbine rotor blade, and the cooling passage includes an inlet and an outlet formed on a blade tip of the turbine rotor blade. The method further includes receiving at least a portion of the cooling airflow exiting the outlet of the cooling passage with an aperture defined in a casing of the gas turbine engine, wherein the casing is spaced from the blade tip along the radial direction. In addition, the method includes providing the cooling airflow received with the aperture defined in the casing to the component of the gas turbine engine through a coolant duct assembly of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

In general, the present subject matter is directed to a system and method for cooling components of a gas turbine engine. Specifically, in several embodiments, the system may include a turbine rotor blade and a casing spaced from the turbine rotor blade along a radial direction. The turbine rotor blade may be comprised of metal, a ceramic matrix composite (CMC), or a combination of metal and CMC, and may include a blade dovetail and a blade tip spaced from the blade dovetail along the radial direction. Further, the turbine rotor blade may define a cooling passage that extends from an inlet at the blade dovetail to an outlet at the blade tip. As such, a cooling airflow may flow through turbine rotor blade via the cooling passage. The casing may include a shroud assembly of the gas turbine engine, and may define an aperture in airflow communication with the outlet such that a portion of cooling airflow exiting the cooling passage through the outlet may be received in the aperture. In addition, the system may include a coolant duct assembly in airflow communication with the aperture of the casing. More specifically, in several embodiments, the coolant duct may deliver the cooling airflow received in the casing to a component of the gas turbine engine. As an example, the coolant duct assembly may deliver the cooling airflow to a vane positioned forward from the turbine rotor blade.

It should be appreciated that the systems and methods of the present disclosure may generally be used to improve cooling within any suitable type of gas turbine engine, including aircraft-based turbine engines and land-based turbine engines.

Figure 1:
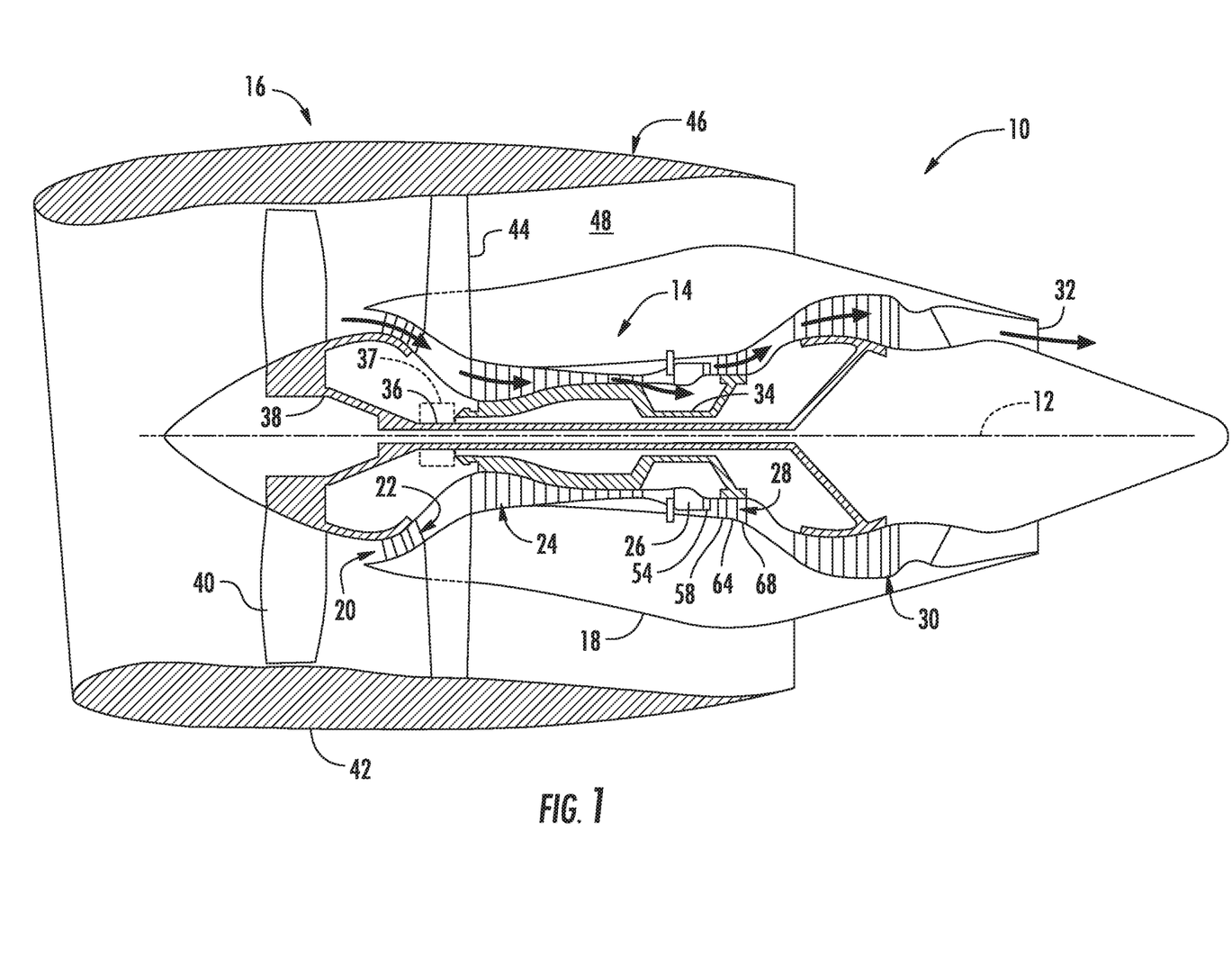
FIG. 1 is a schematic cross-sectional view of a gas turbine engine in accordance with one embodiment of the present disclosure.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also be connected to a fan spool or shaft 38 of the fan section 16. In alternative configurations, the LP spool 36 may be connected to the fan spool 38 via a speed reduction device 37 (depicted in phantom), such as a reduction gear gearbox in an indirect-drive or geared-drive configuration. Such speed reduction devices may be included between any suitable shafts/spools within turbofan 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

Figure 2:
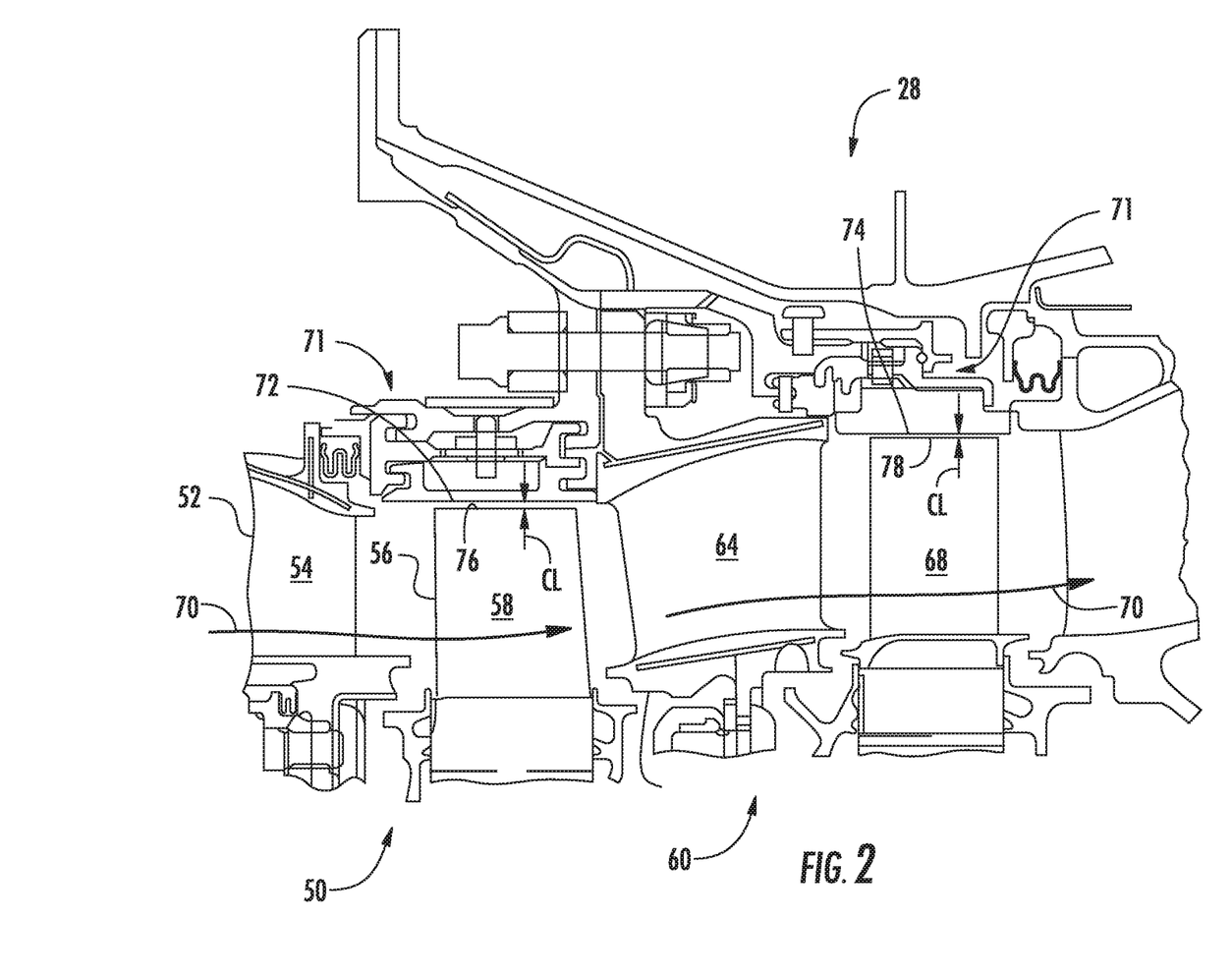
FIG. 2 is an enlarged cross-sectional side view of a high pressure turbine portion of a gas turbine engine in accordance with one embodiment of the present disclosure.

FIG. 2 provides an enlarged cross-sectional view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of vanes 54 (only one shown) axially spaced from an annular array 56 of turbine rotor blades 58 (only one shown). The HP turbine 28 further includes a second stage 60 which includes an annular array 62 of vanes 64 (only one shown) axially spaced from an annular array 66 of turbine rotor blades 68 (only one shown). It should be appreciated that the vanes 54 and 64 may also be referred to as "nozzles" of the HP turbine 28.

As further shown in FIG. 2, the turbofan 10 additionally includes a casing 71 at least partially defining a hot gas path 70 through the turbine section of the turbofan 10 for routing combustion gases from the combustion section 26 (FIG. 1) through, e.g., the HP turbine 28. The turbine rotor blades 58, 68 are positioned at least partially within a hot gas path 70. The casing 71 includes one or more shroud assemblies, each of which forms an annular ring about an annular array of rotor blades. For example, the casing 71 includes a shroud assembly 72 forming an annular ring around the annular array 56 of rotor blades 58 of the first stage 50, and a shroud assembly 74 forming an annular ring around the annular array 66 of turbine rotor blades 68 of the second stage 60. Each of the shroud assemblies 72, 74 generally include a plurality of shrouds and associated hangers (not individually labeled). In general, the shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage within the hot gas path 70. It should be appreciated that although not numbered the exemplary casing 71 further includes additional features and components not described herein. For example, the exemplary casing 71 further includes shroud supports, seals, and other structural components.

It should be noted that shrouds and shroud assemblies may additionally be utilized in a similar manner in the low pressure compressor 22, high pressure compressor 24, and/or low pressure turbine 30. Accordingly, shrouds and shroud assemblies as disclosed herein are not limited to use in HP turbines, and rather may be utilized in any suitable section of a gas turbine engine 14.

Figure 3:
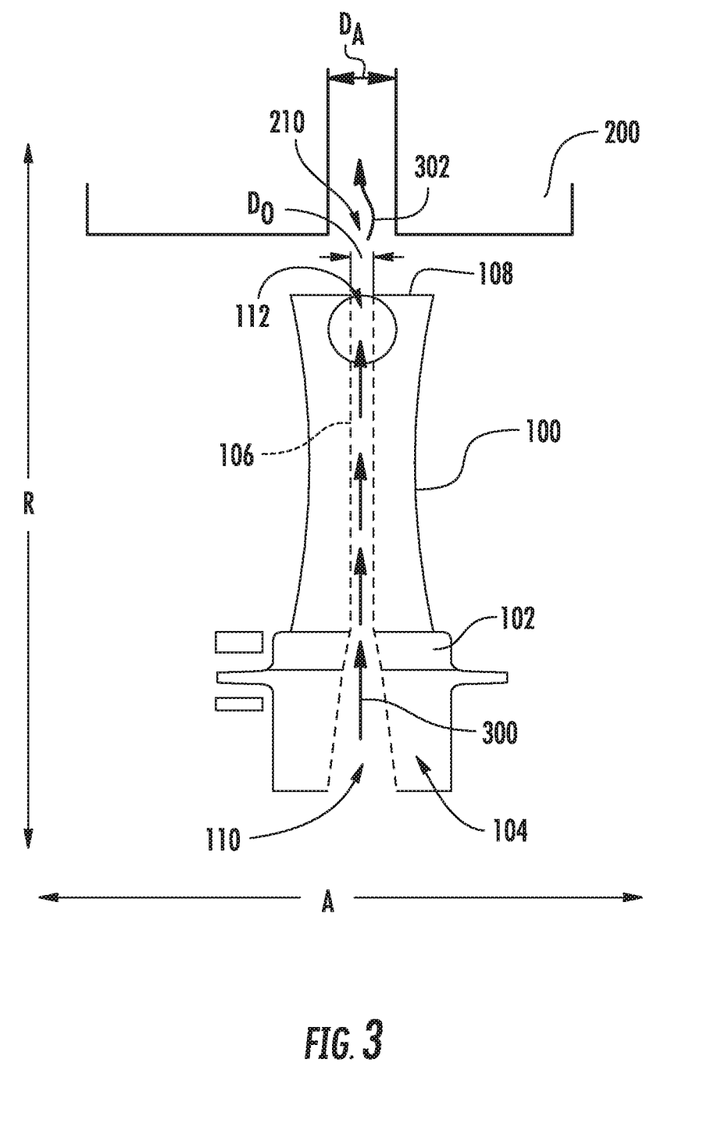
FIG. 3 illustrates a partial sectional side view of an exemplary turbine rotor blade that may be used with the gas turbine engine shown in FIG. 1.

FIG. 3 illustrates a turbine rotor blade 100 in accordance with an exemplary embodiment of the present disclosure. The turbine rotor blade 100 may be utilized in a turbine of a gas turbine engine. For example, in certain embodiments, the turbine rotor blade 100 may be used in the exemplary HP turbine 28 of the gas turbine engine 14 described above, with respect to FIGS. 1 and 2. As shown, the turbine rotor blade 100 defines a radial direction R and an axial direction A that is perpendicular to radial direction R. Further, the turbine rotor blade 100 includes a blade platform 102 formed integrally with a blade dovetail 104. The blade dovetail 104 may be removably coupled to a rotor or wheel (not shown) of the gas turbine engine 14. The turbine rotor blade 100 further defines a cooling passage 106 that extends from the blade dovetail 104 to a blade tip 108 of the turbine rotor blade 100. More specifically, the cooling passage 106 extends between an inlet 110 formed on the dovetail portion 104 and an outlet 112 formed on the blade tip 108. As such, the cooling passage 106 defines a flow path for a cooling airflow, generally represented by flow arrows 300, to flow through the turbine rotor blade 100 along the radial direction R.

It should be appreciated that although, for the embodiment shown in FIG. 3, the flow path is depicted as a single passage extending along the radial direction of the turbine rotor blade, in other embodiments the flow path may include a passage or passages having any suitable geometry. For example, in other embodiments, the turbine rotor blade may include a plurality of cooling passages having any suitable geometry.

Additionally, a casing 200 (such as the exemplary casing 71 of FIG. 2) is spaced from the turbine rotor blade 100 along the radial direction R. It should be appreciated that the exemplary casing 200 depicted in FIG. 3 includes a shroud assembly (such as the exemplary shroud assemblies 72 and 74 of FIG. 2, each including a plurality of shrouds and associated hangers or mounts). The casing 200 may be stationary relative to turbine rotor blade 100, and defines an aperture 210 in airflow communication with the outlet 112 of the cooling passage 106. As such, the aperture 210 of the casing 200 receives at least a portion 302 of the cooling airflow 300 exiting the cooling passage 106 through the outlet 112. In some exemplary embodiments, the aperture 210 of the casing 200 and the outlet 112 of the cooling passage 106 may have a circular cross-section. More specifically, the aperture 210 may define a diameter $D_A$ that is greater than a diameter $D_O$ of the outlet 112. Alternatively, the diameter $D_A$ of the aperture 210 may be equal to the diameter $D_O$ of the outlet 112, and the aperture 210 may be aligned with the outlet 112 along the radial direction R. Still further, in other exemplary embodiments the diameter $D_A$ of the aperture 210 may be less than the diameter $D_O$ of the outlet 112, or alternatively still there may be a plurality of apertures 210 and/or outlets 112.

It should be appreciated that although, for the embodiment shown in FIG. 3, the aperture 210 of the casing 200 is depicted as having a circular cross-section, in other embodiments the aperture 210 may define any suitable cross-sectional shape, such as a rectangle or a triangle. In other embodiments, the aperture 210 may include a plurality of apertures spaced apart around the circumference of the casing 200. Alternatively, in yet another embodiment, the aperture 210 of the casing 200 may be configured as a slot that extends circumferentially around an inside surface of the casing 200. The slot may be in airflow communication with the outlet 112 of the cooling passage 106 for each turbine rotor blade 100 of an annular array of turbine rotor blades, such as the annular array 56 of turbine rotor blades 58 described above and shown in FIG. 2. Furthermore, although the aperture 210 is in airflow communication with a duct (not labeled, see, e.g., duct 651 of FIG. 5) extending perpendicularly away from the casing 200, in other embodiments, the duct may instead define an angle less than or greater than ninety (90) degrees relative to the casing 200 and centerline axis of the engine.

Figure 4:
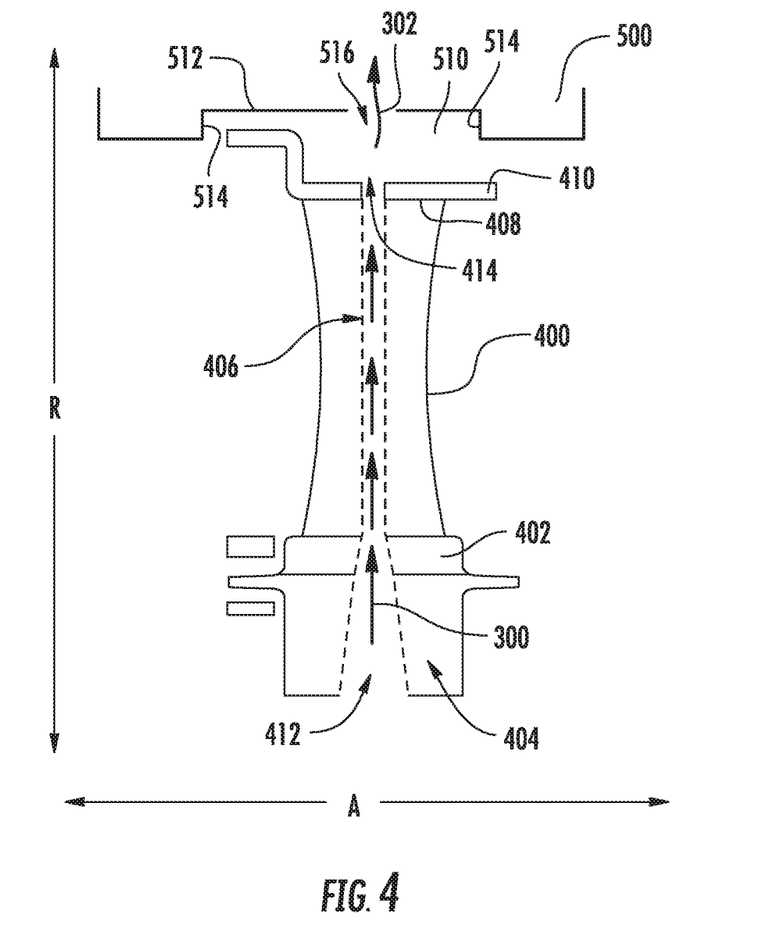
FIG. 4 illustrates a partial sectional side view of another exemplary turbine rotor blade that may be used with the gas turbine engine shown in FIG. 1.

FIG. 4 depicts another exemplary embodiment of a turbine rotor blade 400 in accordance with the present disclosure. The turbine rotor blade 400 may, in certain embodiments, be configured in a substantially similar manner as the turbine rotor blade 100 described above with respect to FIG. 3. For example, the turbine rotor blade 400 of FIG. 4 includes a blade platform 402 formed integrally with a blade dovetail 404, and defines a cooling passage 406 that extends from the blade dovetail 404 to a blade tip 408 of the turbine rotor blade 400 along a radial direction R. However, for the embodiment of FIG. 4, the blade tip 408 includes a blade tip shroud 410, and the cooling passage 406 extends between an inlet 412 formed on the blade dovetail 404 and an outlet 414 formed on the tip shroud 410 of the blade tip 408. Thus, the cooling passage 406 may define a flow path for a cooling airflow, generally represented by flow arrows 300, to flow through the turbine rotor blade 400 along the radial direction R.

It should be appreciated that although, for the embodiment shown in FIG. 4, the flow path is depicted as a single passage extending along the radial direction of the turbine rotor blade, in other embodiments the flow path may include a passage or passages having any suitable geometry.

Still referring to FIG. 4, a casing 500 (such as the exemplary casing 71 of FIG. 2) of the gas turbine engine is spaced from the turbine rotor blade 400 along the radial direction R, and may be stationary relative to the turbine rotor blade 400. In the embodiment depicted, the casing 500 define a recess 510 that, for the embodiment depicted, includes an inside surface 512 and opposing side walls 514. Also, the casing 500 forms an aperture 516 on the inside surface 512 of the recess 510, and the aperture 516 is in airflow communication with the outlet 414 formed on the tip shroud 410 of the blade tip 408. However, it should be appreciated that, in other embodiments, the recess 510 may have any suitable geometry, and as used herein the term "recess" refers generally to any depression in the casing 500 relative to an inner surface immediately upstream and downstream of the turbine rotor blade 100.

Figure 5:
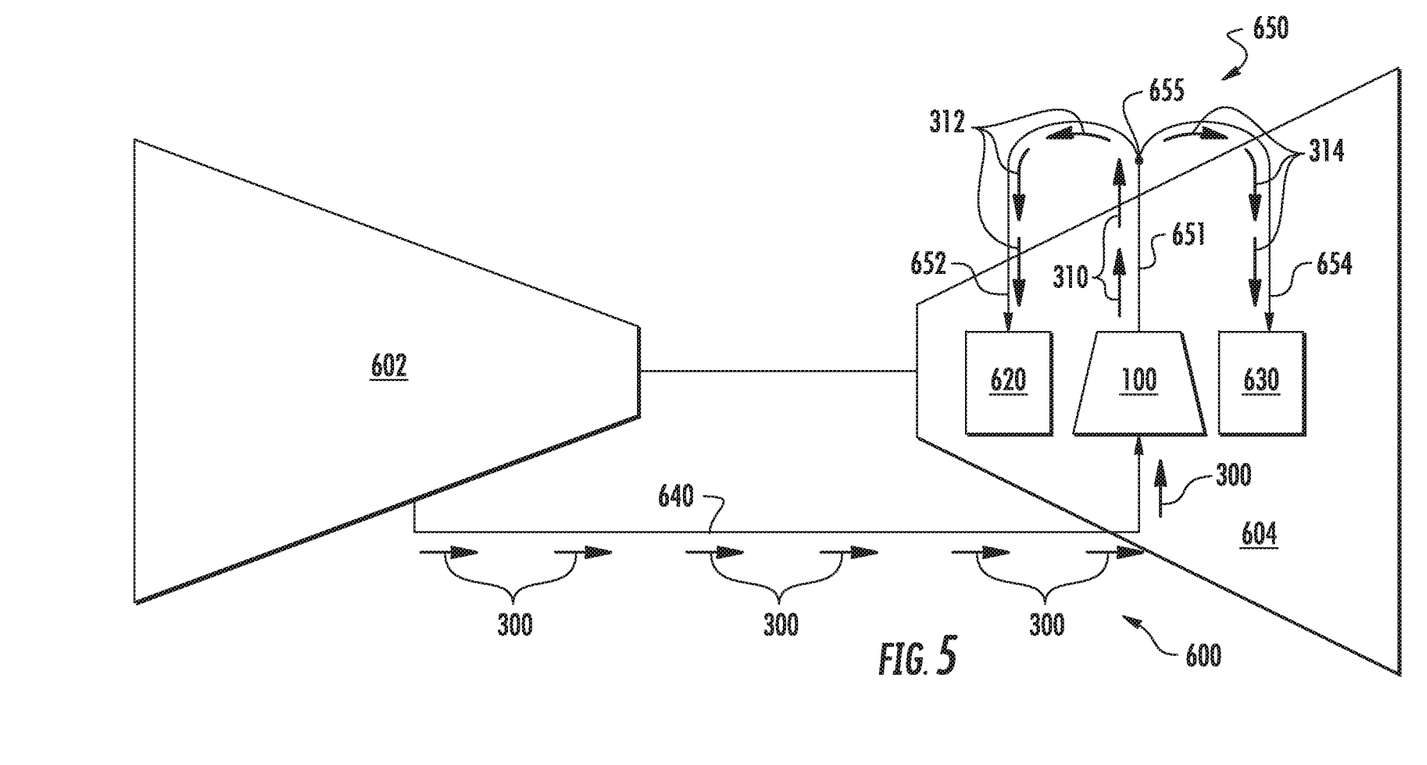
FIG. 5 illustrates a simplified view of one embodiment of a system for cooling components of the gas turbine engine shown in FIG. 1.
Figure 6:
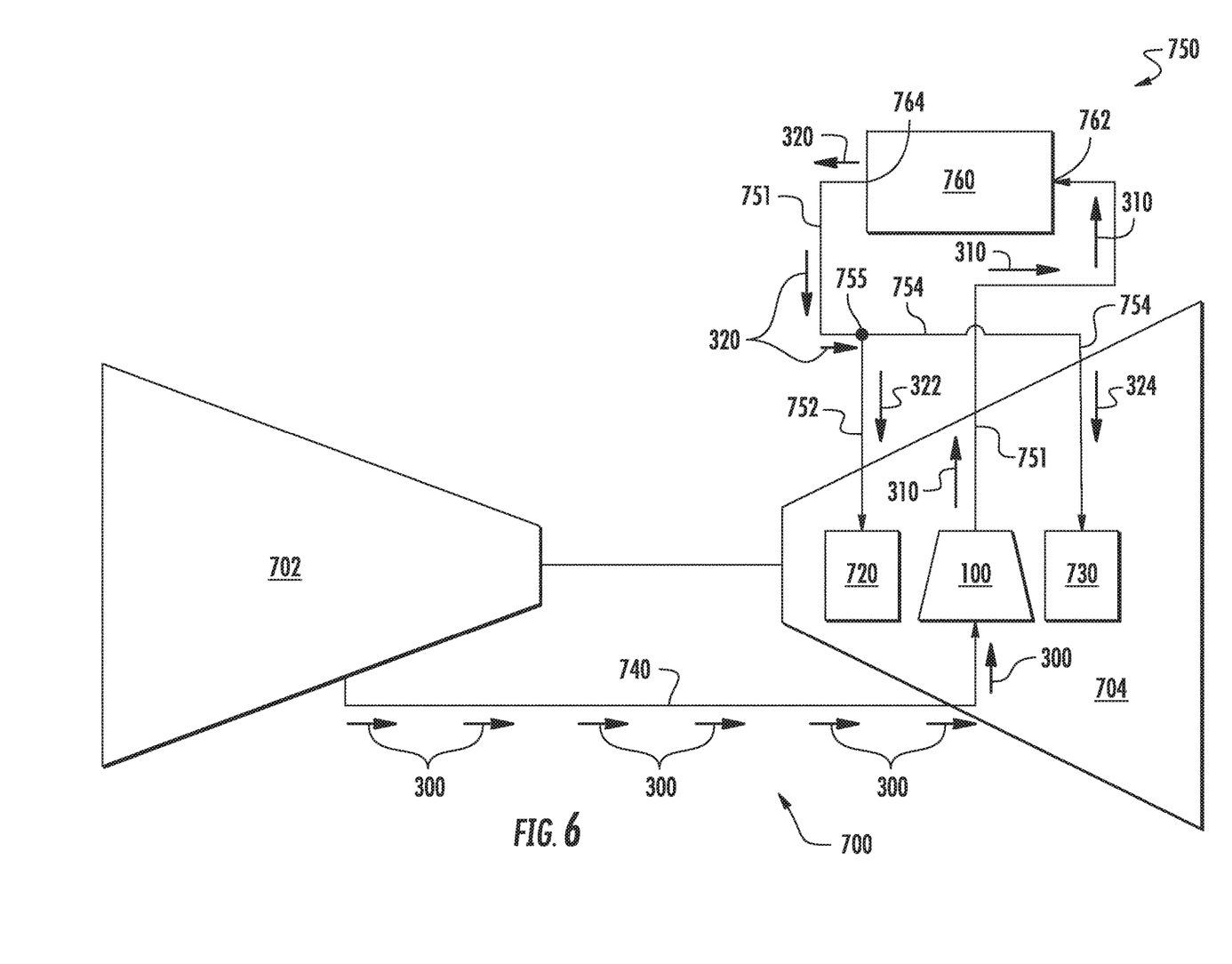
FIG. 6 illustrates a simplified view of another embodiment of a system for cooling components of the gas turbine engine shown in FIG. 1.
Figure 7:
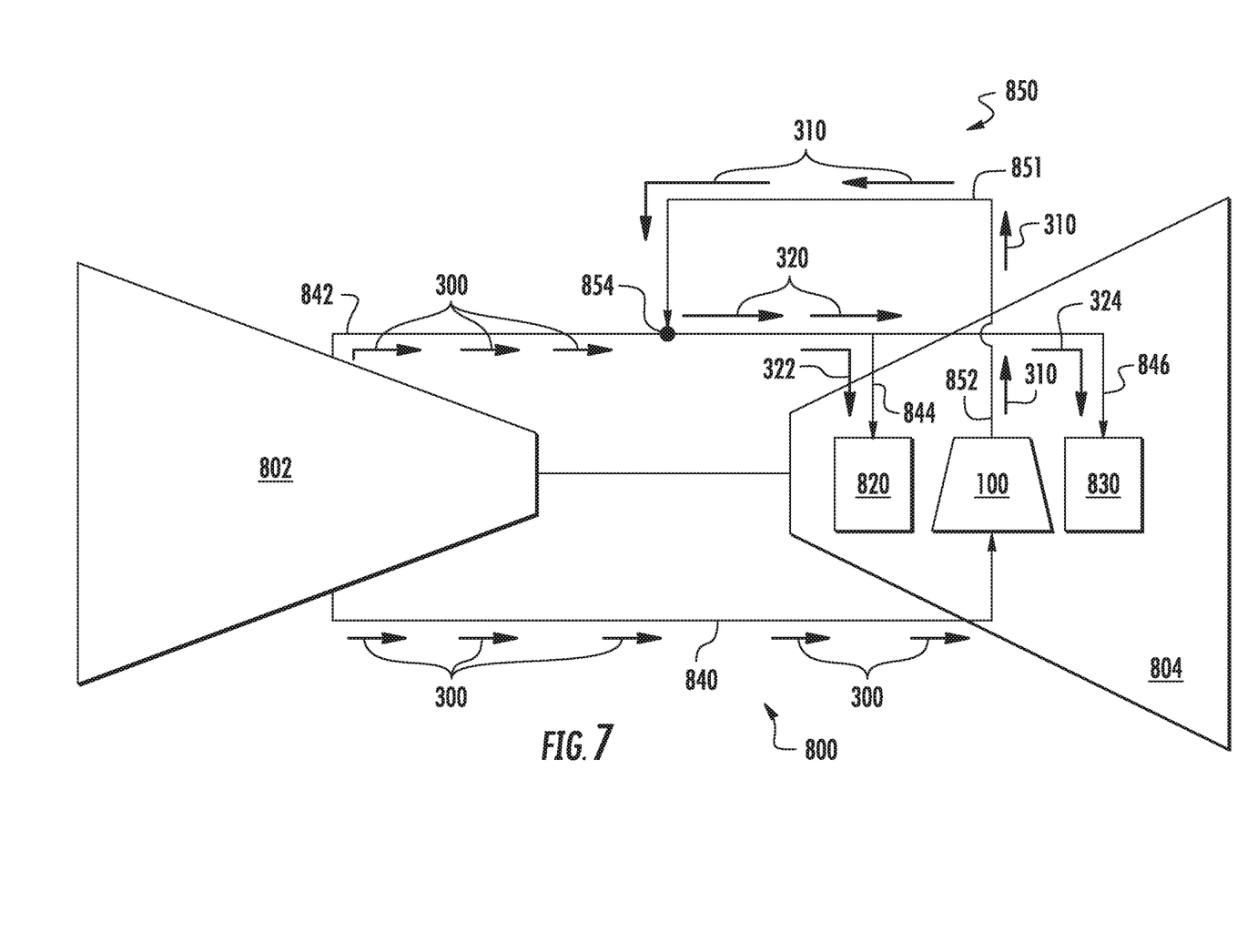
FIG. 7 illustrates a simplified view of yet another embodiment of a system for cooling components of the gas turbine engine shown in FIG. 1.

Still further, for the embodiment depicted in FIG. 4, a portion of the blade tip 408 is positioned within the recess 510 to better ensure a portion 302 of the cooling airflow 300 exiting the cooling passage 406 through the outlet 414 flows into the aperture 516. As shown in FIGS. 5-7 and discussed below in more detail, exemplary embodiments of systems in accordance with the present subject matter may include a coolant duct assembly to deliver at least a portion 310 of the cooling airflow 302 received in the aperture 210 of FIG. 3 or the aperture 516 of FIG. 4 to additional components of the gas turbine engine 14 shown in FIG. 1.

It should be appreciated, that although for the embodiment of FIG. 4 the outlet 414 is not positioned within the recess 510 (and instead a portion of the tip shroud 410 is positioned within the recess 510), in other embodiments, the blade tip 408 may be configured with the casing 500 such that the outlet 414 formed on the blade tip 408 is positioned within the recess 514 of the casing 500.

Referring back to FIG. 3 and now also to FIG. 5, a system 600 for cooling components of the gas turbine engine 14 is provided. The gas turbine engine of FIG. 5 is depicted schematically and may, in certain embodiments, be configured in a substantially similar manner as the gas turbine engine described above with respect to FIGS. 1 and 2. For example, the gas turbine engine and the system 600 generally include a compressor section 602 and a turbine section 604. Additionally, the compressor section 602 may include LP and HP compressors 22 and 24 (FIG. 1), and the turbine section 604 may include LP and HP turbines 58, 68 (FIG. 1). Further, the turbine section 604 includes a turbine rotor blade 100, a first vane 620 positioned forward from turbine blade 100, and a second vane 630 positioned aft of turbine rotor blade 100. In certain embodiments, the first vane 620 may be the vane 54 described above with reference to FIG. 2, the turbine rotor blade 100 may be the turbine rotor blade 58 described above with reference to FIG. 2, and the second vane 630 may be the vane 64 described above with reference to FIG. 2. However, in other embodiments, the first vane 620, the second vane 630, and the turbine rotor blade 100 may instead be configured as any other suitable vane and/or turbine rotor blade.

As shown, the gas turbine engine and exemplary system 600 additionally includes a conduit 640 extending between the compressor section 602 and the turbine rotor blade 100 of the turbine section 604. Further, the conduit 640 may receive a flow of compressed air (a cooling airflow) from one or both of the LP and HP compressors.

Referring particularly to FIG. 3, the conduit 640 is in airflow communication with the inlet 110 of the cooling passage 106 such that a cooling airflow 300 flowing through the conduit 640 enters the cooling passage 106 through the inlet 110. Also, as mentioned above, the cooling airflow 300 flows along the radial direction R and exits the cooling passage 106 through the outlet 112 formed on the blade tip 108 of the turbine rotor blade 100. Further, a portion 302 of the cooling airflow 300 exiting the cooling passage 106 through the outlet 112 is received in the aperture 210 formed on the casing 200 that is spaced from the blade tip 108 along the radial direction R.

Referring now particularly to FIG. 5, the exemplary system 600 includes a coolant duct assembly 650 that receives at least a portion 310 of the cooling airflow 302 provided through the aperture 210 of the casing 200. In addition, the coolant duct assembly 650 delivers the cooling airflow 310 to one or more additional components of the gas turbine engine. In the embodiment shown, the coolant duct assembly 650 includes a primary duct 651 that branches into a first and second duct 652 and 654 at a junction 655. The first duct 652 delivers a first portion 312 of the cooling airflow 310 provided through the primary duct 751 to a first vane 620 positioned forward from the turbine rotor blade 100. Further, the second duct 654 delivers a second portion 314 of the cooling airflow 310 provided through the primary duct 751 to a second vane 630 positioned aft of the turbine rotor blade 100.

It should be appreciated that the coolant duct assembly 650 may, in some embodiments, include a channel extending around a circumference of the casing 200, and the channel may be in airflow communication with one or more ducts extending from the channel to a component of the gas turbine engine, such as the first and second vanes 620 and 630 mentioned above and depicted in FIG. 5.

In some embodiments, a cross-sectional area of the first duct 652 may be greater than a cross-sectional area of the second duct 654. As such, in those particular embodiments, the first portion 312 of the cooling airflow 310 delivered to the first vane 620 may be greater than the second portion 314 of the cooling airflow 310 delivered to the second vane 630. However, in other embodiments, the cross-sectional area of the first duct 652 may be less than the cross-sectional area of the second duct 654. Alternatively, the cross-sectional area of the first duct 652 may be equal to the cross-sectional area of the second duct 654.

It should be appreciated that for the system 600 of FIG. 5, the components cooled by the cooling airflow 310 captured from the aperture 210 of the casing 200 are configured as a first vane 620 and a second vane 630. In other exemplary embodiments, the system 600 may additionally, or alternatively, be configured to cool any other suitable component of the gas turbine engine. For example, in other embodiments, the system 600 may be configured to cool one or more shrouds or shroud assemblies, such as the exemplary shrouds 72 and 74 described above with reference to FIG. 2.

Referring again to FIG. 3 and now also to FIG. 6, a system 700 for cooling components of the gas turbine engine 14 in accordance with another embodiment of the present disclosure is provided. The gas turbine engine and the exemplary system 700 of FIG. 6 is depicted schematically and may, in certain embodiments, be configured in a substantially similar manner as the gas turbine engine and exemplary system 600 described above with respect to FIGS. 1, 2, and 5. For example, the gas turbine engine and the system 700 generally include a compressor section 702 and a turbine section 704. Additionally, the compressor section 702 may include LP and HP compressors 22 and 24 (FIG. 1), and the turbine section 704 may include LP and HP turbines 58 and 68 (FIG. 1). Further, the turbine section 704 includes a turbine rotor blade 100, a first vane 720 positioned forward from the turbine rotor blade 100, and a second vane 730 positioned aft of the turbine rotor blade 100. As shown, a conduit 740 extends between the compressor section 702 and the turbine rotor blade 100 of the turbine section 704. Further, the conduit 740 may receive a flow of compressed air (a cooling airflow) from one or both of the LP and HP compressors.

Referring particularly to FIG. 3, the conduit 740 is in airflow communication with the inlet 110 of the cooling passage 106 such that the cooling airflow 300 flowing through the conduit 740 enters the cooling passage 106 through the inlet 110. Also, as mentioned above, the cooling airflow 300 flows along the radial direction R and exits the cooling passage 106 through the outlet 112 formed on the blade tip 108 of the turbine rotor blade 100. Further, at least a portion 302 of the cooling airflow 300 exiting the cooling passage through the outlet 112 is received in the aperture 210 formed on the casing 200 that is spaced from the blade tip 108 along the radial direction R.

Referring now particularly to FIG. 6, the system 700 includes a coolant duct assembly 750 in airflow communication with the aperture 210 formed on the casing 200. The coolant duct assembly 750 delivers a portion of the cooling airflow 310 provided through the aperture 210 to a component of the gas turbine engine, such as, for the embodiment depicted, the first vane 720, the second vane 730, or both.

The coolant duct assembly 750 of FIG. 6 includes a primary duct 751 for receiving at least a portion of the cooling airflow 310 provided through the aperture 210 of the casing 200. The coolant duct assembly 750 additionally includes a heat exchanger 760 for removing heat from the cooling airflow 310 provided through the primary duct 751. In the embodiment shown, the heat exchanger 760 includes an inlet 762 in airflow communication with the primary duct 751, and also includes an outlet 764 in airflow communication with the primary duct 751. As such, the cooling airflow 310 provided through the primary duct 751 enters the heat exchanger 760 through the inlet 762. Further, the heat exchanger 760 removes heat from the cooling airflow 310, and a cooling airflow 320, which is at a cooler temperature relative to the cooling airflow 310 entering the heat exchanger 760, flows back into the primary duct 751 through the outlet 764 of the heat exchanger 760.

The heat exchanger 760 may be configured as one of an air-air heat exchanger, an oil-air heat exchanger, or a fuel-air heat exchanger. For example, the heat exchanger 760 may receive a flow of air from, e.g., a bypass passage of the gas turbine engine (i.e., air-air heat exchanger). Alternatively, the heat exchanger 760 may be configured to receive a flow of lubrication oil from a thermal management system of the gas turbine engine (i.e., oil-air heat exchanger), or a flow of fuel from a fuel system of the gas turbine engine (i.e., a fuel-air heat exchanger). The heat exchanger 760 may further include a compressor (not shown) to increase a pressure of the cooling airflow provided through the heat exchanger, or downstream of the heat exchanger.

Still referring to FIG. 6, the primary duct 751 branches into a first duct 752 and a second duct 754 at a junction 755 positioned downstream from the outlet 764 of the heat exchanger 760. In the embodiment shown, the first duct 752 delivers a first portion 322 of the cooling airflow 320 exiting the heat exchanger 760 to the first vane 720. In addition, the second duct 754 delivers a second portion 324 of the cooling airflow 320 exiting the heat exchanger 760 to the second vane 730.

Referring back to FIG. 3 and now also to FIG. 7, a system 800 for cooling components of a gas turbine engine in accordance with yet another embodiment of the present disclosure is provided. The gas turbine engine and exemplary system 800 of FIG. 7 is depicted schematically and may, in certain embodiments, be configured in a substantially similar manner as the gas turbine engine and exemplary system 600 described above with respect to FIGS. 1, 2, and 5. For example, the gas turbine engine and the system 800 generally include a compressor section 802 and a turbine section 804. Additionally, the compressor section 802 includes LP and HP compressors 22 and 24 (FIG. 1), and the turbine section 804 includes LP and HP turbines 58 and 68 (FIG. 1). Further, the turbine section 804 includes a turbine rotor blade 100, a first vane 820 positioned forward from turbine blade 100, and a second vane 830 positioned aft of turbine rotor blade 100. As shown, a conduit 840 extends between the compressor section 802 and the turbine rotor blade 100 of the turbine section 804. Further, the conduit 840 may receive a flow of compressed air (a cooling airflow) from one or both of the LP and HP compressors.

Referring particularly to FIG. 3, the conduit 840 is in airflow communication with the inlet 110 of the cooling passage 106 such that the cooling airflow 300 traveling through the conduit 840 enters the cooling passage 106 through the inlet 110. Also, as mentioned above, the cooling airflow 300 flows along the radial direction R and exits the cooling passage 106 through the outlet 112 formed on the blade tip 108 of the turbine rotor blade 100. Further, a portion 302 of the cooling airflow 300 exiting the cooling passage 106 through the outlet 112 is received in the aperture 210 formed on the casing 200 that is spaced from the blade tip 108 along the radial direction R.

Referring now particularly to FIG. 7, the system 700 includes a coolant duct assembly 850 in airflow communication with the aperture 210 formed on the casing 200. The coolant duct assembly 850 delivers at least a portion 310 of the cooling airflow 302 provided through the aperture 210 to a component of the gas turbine engine, such as, for the embodiment depicted, the first vane 820, the second vane 830, or both.

The coolant duct assembly 850 of FIG. 7 includes a primary duct 851 having an inlet 852 in airflow communication with the aperture 210 of the casing 200. As such, at least a portion 310 of the cooling airflow 302 provided through the aperture 210 flows into the primary duct 851 through the inlet 852. Further, the primary duct 851 merges with a conduit 842 (i.e., a cooling airflow conduit) at a junction 854 positioned downstream of the inlet 852 such that the cooling airflow 310 provided through the primary duct 851 merges with the cooling airflow 300 flowing through the conduit 842 which, as shown, is in airflow communication with the compressor section 802. The system 800 may include any suitable components for merging cooling airflows 300 and 310, such as for example a flow ejector device. Further, since the cooling airflow 310 provided through the primary duct 851 is warmer relative to the cooling airflow 300 flowing through the conduit 842, the cooling airflow 310 is cooled when merged with the cooling airflow 300, and the cooling airflow 300 is warmed. Thus, a cooling airflow 320 is formed when the cooling airflow 310 provided through the primary duct 851 merges with the cooling airflow 300 flowing through the conduit 842.

The coolant duct assembly 850 of the system 800 shown in FIG. 7 further includes a first duct 844 and a second duct 846. As shown, the first and second ducts 844 and 846 branch off of the conduit 842. In particular, the first duct 844 delivers a first portion 322 of the cooling airflow 320 to the first vane 820, and the second duct 846 delivers a second portion 324 of the cooling airflow 320 to the second vane 830.

Figure 8:
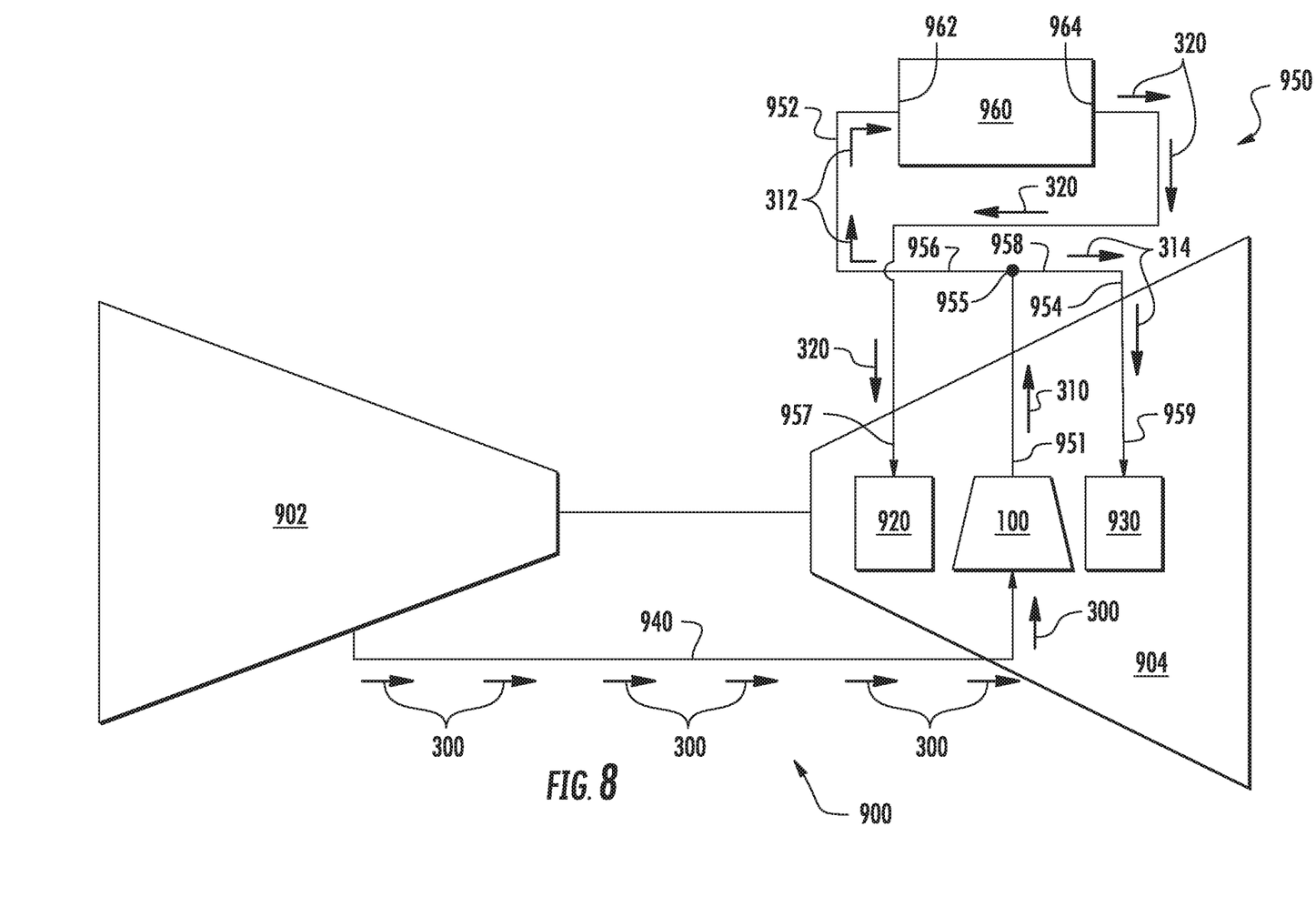
FIG. 8 illustrates a simplified view of still another embodiment of a system for cooling components of the gas turbine engine shown in FIG. 1.

Referring back to FIG. 3 and now also to FIG. 8, a system 900 for cooling components of a gas turbine engine in accordance with yet another embodiment of the present disclosure is provided. The gas turbine engine and exemplary system 100 of FIG. 7 is depicted schematically and may, in certain embodiments, be configured in a substantially similar manner as the gas turbine engine and exemplary system 600 described above with respect to FIGS. 1, 2, and 5. For example, the gas turbine engine and the system 900 generally include a compressor section 902 and a turbine section 904. Additionally, the compressor section 902 includes LP and HP compressors 22 and 24 (FIG. 1), and the turbine section 904 includes LP and HP turbines 58 and 68 (FIG. 1). Further, the turbine section 904 includes a turbine rotor blade 100, a first vane 920 positioned forward from turbine blade 100, and a second vane 930 positioned aft of turbine rotor blade 100 As shown, a conduit 940 extends between the compressor section 902 and the turbine rotor blade 100 of the turbine section 904. Further, the conduit 940 may receive a flow of compressed air (a cooling airflow) from one or both of the LP and HP compressors.

Referring particularly to FIG. 3, the conduit is in airflow communication with the inlet 110 of the cooling passage 106 such that the cooling airflow 300 flowing through the conduit 940 enters the cooling passage 106 through the inlet 110. Also, as mentioned above, the cooling airflow 300 flows along the radial direction R and exits the cooling passage 106 through the outlet 112 formed on the blade tip 108 of the turbine rotor blade 100. Further, a portion 302 of the cooling airflow 300 exiting the cooling passage 106 through the outlet 112 is received in the aperture 210 formed on the casing 200 that is spaced from the blade tip 108 along the radial direction R.

Referring now particularly to FIG. 8, the system 900 includes a coolant duct assembly 950 in airflow communication with the aperture 210 formed on the casing 200. The coolant duct assembly 950 delivers a portion 310 of the cooling airflow 302 provided through the aperture 210 to a component of the gas turbine engine, such as, for the embodiment depicted, the first vane 920, the second vane 930, or both.

The coolant duct assembly 950 of FIG. 8 includes a primary duct 951 for receiving at least a portion 310 of the cooling airflow 302 provided through the aperture 210 of the casing 200. Additionally, in the embodiment shown, the primary duct 951 branches into a first duct 952 and a second duct 954 at a junction 955. The first duct 952 receives a first portion 312 of the cooling airflow 310 provided through the primary duct 951, and the second duct 954 receives a second portion 314 of the cooling airflow 310 provided through the primary duct 951. In some embodiments, a cross-sectional area of the first duct 952 may be greater than a cross-sectional area of the second duct 954. As such, the first portion 312 of the cooling airflow 310 may be greater than the second portion 314 of the cooling airflow 310. However, in other embodiments, the cross-sectional area of the first duct 952 may be less than the cross-sectional area of the second duct 954. Alternatively, the cross-sectional area of the first duct 952 may be equal to the cross-sectional area of the second duct 954.

The first duct 952 of the coolant duct assembly 950 includes an inlet 956 and outlet 957. In addition, the first duct 952 also includes a heat exchanger 960 positioned between the inlet 956 and outlet 957 of the first duct 952. The heat exchanger 960 includes an inlet 962 in airflow communication with the first duct 952, and also includes an outlet 964 in airflow communication with the first duct 952. As such, the first portion 312 of the cooling airflow 310 flows into the heat exchanger 960 through the inlet 962. Further, the heat exchanger 960 removes heat from the first portion 312 of the cooling airflow 310, and a cooling airflow 320, which is at a cooler temperature relative to the first portion 312 of cooling airflow 310 entering the heat exchanger 960, flows back into the first duct 952 through the outlet 964 of the heat exchanger 960. Still further, the first duct 952 delivers the cooling airflow 320 exiting the heat exchanger 960 to the first vane 920 via the outlet 957 of the first duct 952.

Figure 9:
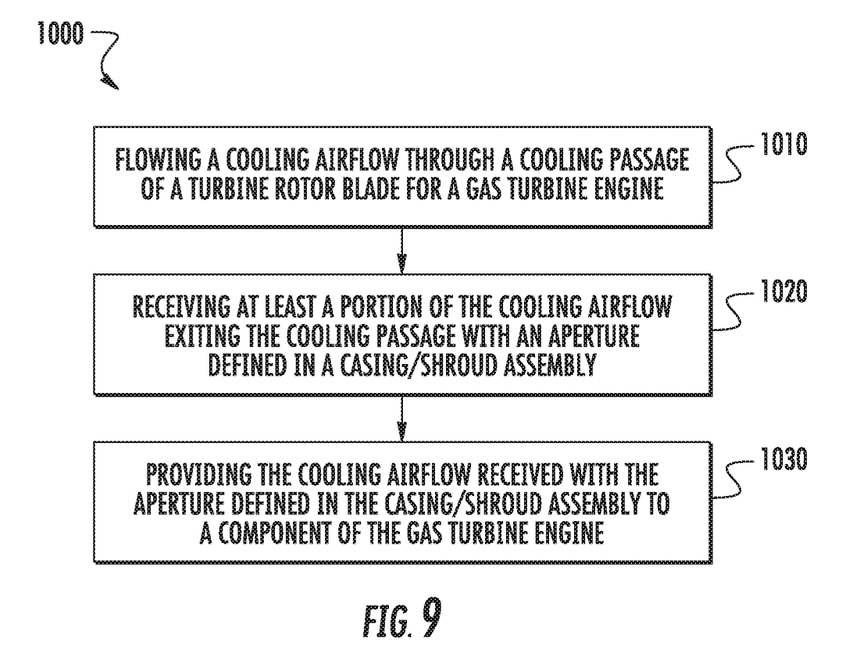
FIG. 9 illustrates a flow diagram of one embodiment of a method for cooling components of the gas turbine engine shown in FIG. 1.

The second duct 954 of the coolant duct assembly 950 shown in FIG. 9 includes an inlet 958 and an outlet 959. As such, the second duct 954 delivers the second portion 314 of the cooling airflow 310 from the primary duct 951 to the second vane 930. More specifically, the second portion 314 of the cooling airflow 310 exits the second duct 954 through the outlet 959.

In general, the exemplary embodiments of the systems mentioned above and depicted in FIGS. 5-8 provide various advantages. In particular, the systems mentioned above may improve upon the specific fuel consumption (SFC) of a gas turbine engine, because the gas turbine engine may require less compressed air (a cooling airflow) from a compressor. Further, since the systems of the present disclosure recycle the cooling airflow emitted from the turbine rotor blade of the gas turbine engine to cool additional components, the durability and time on wing (TOW) of the turbine rotor blade and the additional components may also be improved.

Referring now to FIG. 9, a flow diagram of a method 1000 for cooling a component of a gas turbine engine in accordance with an exemplary embodiment of the present disclosure is provided. The exemplary method 1000 of FIG. 9 may be utilized with the exemplary rotor blade 100 described above with reference to FIGS. 3 and/or 4, and further may be utilized with one or more of the exemplary systems described above with reference to FIGS. 5-8. Although FIG. 9 depicts steps performed in a particular order for purposes of illustration and discussion, the methods discussed herein are not limited to any particular order or arrangement. For example, it will be appreciated that various steps of the methods disclosed herein can be omitted, rearranged, combined, and/or adopted in various ways without deviating from the scope of the present disclosure.

As shown in FIG. 9, the method 1000 includes, at (1010), flowing a cooling airflow through a cooling passage of a turbine rotor blade. As mentioned above and shown in FIGS. 3 and 4, the cooling passage extends along a radial direction of the turbine rotor blade, and includes an inlet and an outlet formed on a blade tip of the turbine rotor blade.

Additionally, at (1020), the method 1000 includes receiving at least a portion of the cooling airflow exiting the outlet of the cooling passage with an aperture defined in a casing. As mentioned above and shown in FIGS. 3 and 4, the casing is spaced from the blade tip along the radial direction R, and may include a recess. Further, in some embodiments, the blade tip of the turbine rotor blade includes a blade tip shroud, and at least a portion of the tip shroud is positioned within the recess of the casing.

Moreover, at (1030), the method 1000 includes providing the cooling airflow received with the aperture defined in the casing to the component of the gas turbine through a coolant duct assembly of the gas turbine engine. In some embodiments, the coolant duct assembly delivers a first portion of the cooling airflow to a first vane positioned forward from the turbine rotor blade. Further, the coolant duct assembly also delivers a second portion of the cooling airflow to a second vane positioned aft of the turbine rotor blade.

Figure 10:
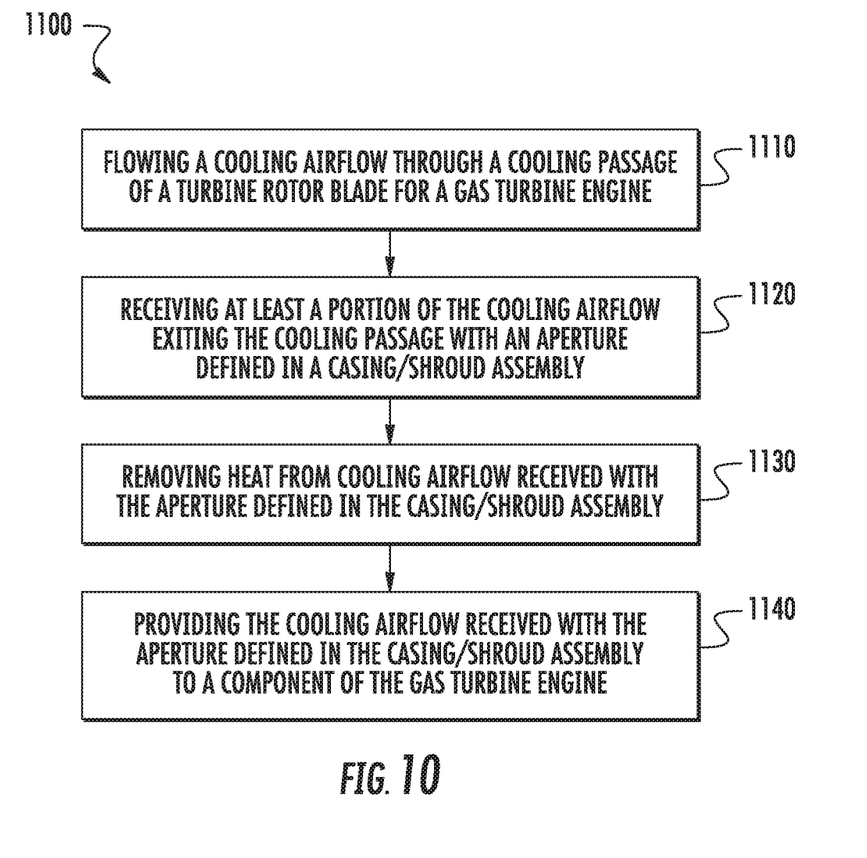
FIG. 10 illustrates a flow diagram of another embodiment of a method for cooling components of the gas turbine engine shown in FIG. 1.

Referring now to FIG. 10, a method 1100 for cooling components of a turbine engine 14 in accordance with another exemplary embodiment of the present disclosure is provided. A flow diagram of a method 1100 for cooling a component of a gas turbine engine in accordance with an exemplary embodiment of the present disclosure is provided. The exemplary method 1100 of FIG. 10 may be utilized with the exemplary rotor blade 100 described above with reference to FIGS. 3 and/or 4, and further may be utilized with one or more of the exemplary systems described above with reference to FIGS. 5-8. Although FIG. 10 depicts steps performed in a particular order for purposes of illustration and discussion, the methods discussed herein are not limited to any particular order or arrangement. For example, it will be appreciated that various steps of the methods disclosed herein can be omitted, rearranged, combined, and/or adopted in various ways without deviating from the scope of the present disclosure.

As shown in FIG. 10, the method 1100 includes, at (1110), flowing a cooling airflow through a cooling passage of a turbine rotor blade. As mentioned above and shown in FIGS. 3 and 4, the cooling passage extends along a radial direction of the turbine rotor blade, and includes an inlet and an outlet formed on a blade tip of the turbine rotor blade.

Additionally, at (1120), the method 1100 includes receiving at least a portion of the cooling airflow exiting the outlet of the cooling passage with an aperture defined in a casing. As mentioned above and shown in FIGS. 3 and 4, the casing is spaced from the blade tip along the radial direction R, and may include a recess. Further, in some embodiments, the blade tip of the turbine rotor blade includes a blade tip shroud, and at least a portion of the tip shroud is positioned within the recess of the casing.

Moreover, at (1130), the method includes removing heat from the cooling airflow received with the aperture defined in the casing. As mentioned above and shown in FIGS. 6-8, heat may, in some embodiments, be removed from the cooling airflow received in the aperture with a heat exchanger, or, alternatively, heat may be removed by merging the cooling airflow with a cooling airflow from a compressor of the gas turbine engine positioned forward from the turbine rotor blade.

Further, at (1140), the method 1100 includes providing the cooling airflow received with the aperture defined in the casing and cooled at (1130) to the component of the gas turbine through a coolant duct assembly of the gas turbine engine. In some embodiments, the coolant duct assembly delivers a first portion of the cooling airflow to a first vane positioned forward from the turbine rotor blade. Further, the coolant duct assembly also delivers a second portion of the cooling airflow to a second vane positioned aft of the turbine rotor blade.

In general, the exemplary embodiments of the methods mentioned above and depicted in FIGS. 9 and 10 provide various advantages. In particular, the methods mentioned above improve upon the specific fuel consumption (SFC) of a gas turbine engine, because the gas turbine engine requires less compressed air (a cooling airflow) from a compressor. Further, since the methods mentioned above disclose recycling a cooling airflow emitted from the turbine rotor blade of the gas turbine engine to cool additional components, the durability and time on wing (TOW) of the turbine rotor blade and the additional components improve.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for cooling a component of a gas turbine engine comprising a compressor section and a turbine section and defining a radial direction, the component positioned within the turbine section, and the system comprising:
   a turbine rotor blade positioned within the turbine section and defining a cooling passage for providing a cooling airflow through the turbine rotor blade, the cooling passage having an inlet in airflow communication with the compressor section of the gas turbine engine and an outlet spaced from the inlet along the radial direction, the turbine rotor blade comprising a blade tip, the outlet of the cooling passage formed on the blade tip of the turbine blade;
   a casing spaced from the blade tip along the radial direction, the casing defining an aperture in airflow communication with the outlet of the cooling passage; and
   a coolant duct assembly in airflow communication with the aperture of the casing for receiving at least a portion of the cooling airflow from the outlet of the cooling passage in the turbine rotor blade and distributing the cooling airflow to the component of the gas turbine engine, the coolant duct assembly comprising a heat exchanger positioned downstream of the aperture of the casing and upstream of the component of the gas turbine engine for removing heat from the cooling airflow to be provided to the component;
   wherein the component includes a first vane and a second vane, the first vane positioned forward of the turbine rotor blade and the second vane positioned aft of the turbine rotor blade, wherein the coolant duct further includes a first duct and a second duct each meeting at a junction, the first duct providing a first portion of cooling airflow from the junction to the first vane, and the second duct providing a second portion of cooling airflow from the junction to the second vane, and wherein the heat exchanger is operable with, or positioned upstream of, the first duct, the second duct, or both at a location downstream of the junction.

2. The system of claim 1, wherein the casing defines a recess, and wherein the aperture is formed on an inside surface of the recess.

3. The system of claim 1, wherein the blade tip of the turbine rotor blade includes a blade tip shroud.

4. The system of claim 3, wherein the outlet of the cooling passage is formed on a surface of the blade tip shroud.

5. The system of claim 1, wherein the component further includes a turbine shroud.

6. The system of claim 1, wherein the second vane is positioned aft of the turbine rotor blade within the turbine section.

7. The system of claim 6, wherein the first vane is positioned forward of the turbine rotor blade within the turbine section.

8. The system of claim 1, wherein the heat exchanger is configured as at least one of: an air-air heat exchanger; an oil-air heat exchanger; and a fuel-air heat exchanger.

9. The system of claim 1, wherein the heat exchanger is operable with, or positioned within, the first duct at a location downstream of the junction.

10. The system of claim 1, wherein the first duct defines a first cross-sectional area, wherein the second duct defines a second cross-sectional area, and wherein the first cross-sectional area is different than the second cross-sectional area.

11. A method for cooling a component of a gas turbine engine, the gas turbine engine defining a radial direction and comprising a turbine rotor blade and a casing, the turbine rotor blade defining a cooling passage and comprising a blade tip, the method comprising:

flowing a cooling airflow through the cooling passage of the turbine rotor blade, the cooling passage having an inlet and an outlet formed on the blade tip of the turbine rotor blade;

receiving at least a portion of the cooling airflow exiting the outlet of the cooling passage with an aperture defined in the casing of the gas turbine engine, the casing spaced from the blade tip along the radial direction; and     providing the cooling airflow received with the aperture defined in the casing to the component of the gas turbine engine through a coolant duct assembly of the gas turbine engine; and     removing heat from the cooling airflow received with the aperture defined in the casing with a heat exchanger at a location downstream of the aperture of the casing prior to providing the cooling airflow to the component;

wherein the component includes a first vane and a second vane, the first vane positioned forward of the turbine rotor blade and the second vane positioned aft of the turbine rotor blade, wherein the coolant duct further includes a first duct and a second duct each meeting at a junction, the first duct providing a first portion of cooling airflow from the junction to the first vane, and the second duct providing a second portion of cooling airflow from the junction to the second vane, and wherein the heat exchanger is operable with, or positioned upstream of, the first duct, the second duct, or both at a location downstream of the junction.

12. The method of claim 11, wherein removing heat from the cooling airflow received with the aperture defined in the casing further includes merging the cooling airflow with a cooling airflow from a compressor of the gas turbine engine positioned forward of the turbine rotor blade.

13. The method of claim 11, wherein the first duct includes the heat exchanger for removing heat from the first portion of the cooling airflow.

14. The method of claim 11, wherein a compressor of the gas turbine engine provides the cooling airflow flowing through the cooling passage of the turbine rotor blade; and wherein the compressor provides the cooling airflow to the cooling passage through a conduit that extends between the compressor and an inlet of the cooling passage.

15. The method of claim 14, wherein the coolant duct merges with the conduit at a junction; and wherein the cooling airflow provided through the coolant duct merges with the cooling airflow flowing through the conduit at the junction.

\* \* \* \* \*